Patented Feb. 7, 1933

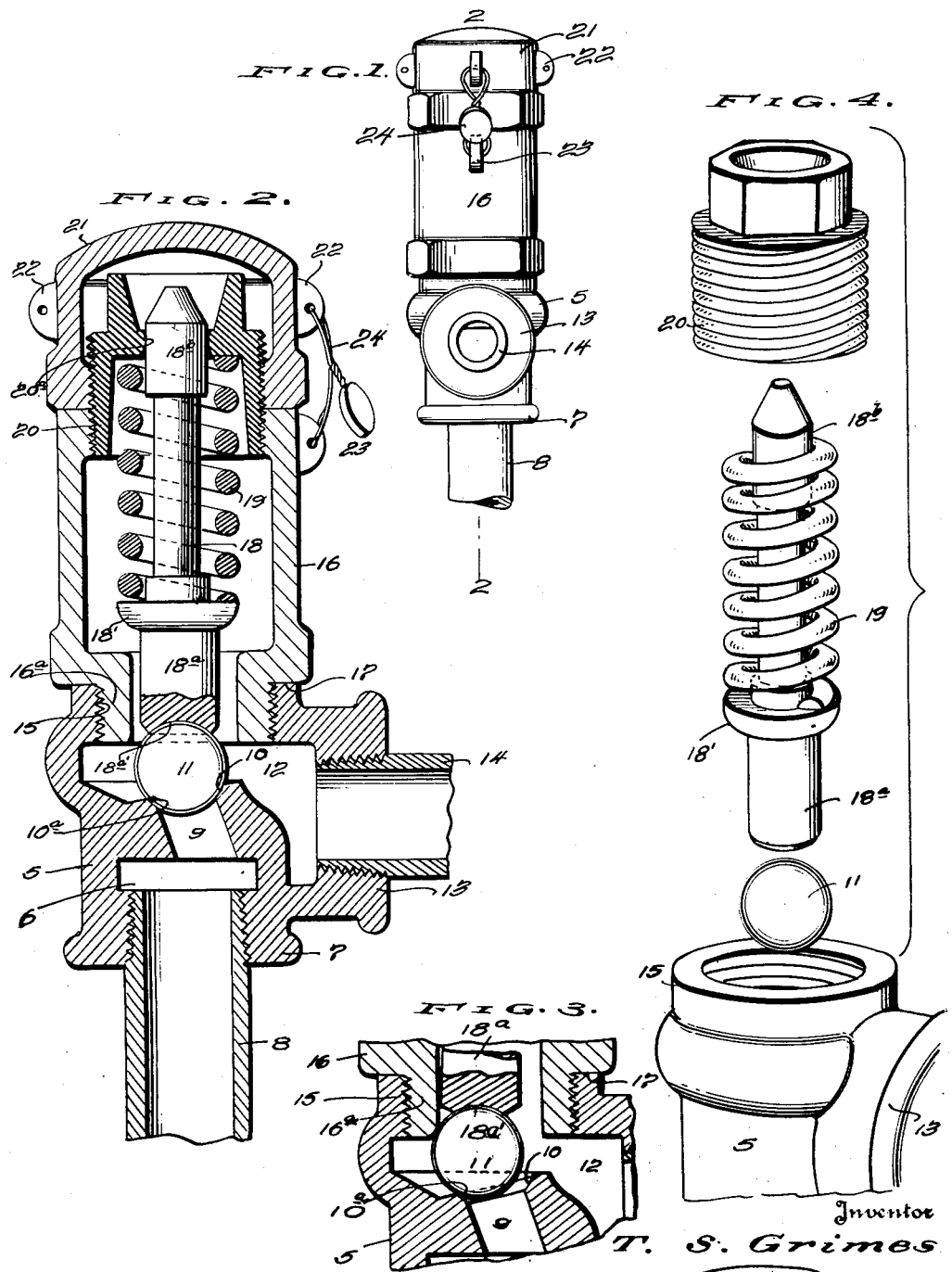

1,896,706

UNITED STATES PATENT OFFICE

THADDEUS S. GRIMES, OF COLUMBUS, GEORGIA, ASSIGNOR TO LUMMUS COTTON GIN COMPANY, OF COLUMBUS, GEORGIA, A CORPORATION OF GEORGIA

VALVE

Application filed March 7, 1929. Serial No. 345,158.

My invention relates to improvements in valves, and has been found to be especially applicable to hydraulic relief valves, although capable of many other applications.

Briefly stated, the invention has for one of its primary objects the provision of a novel valve construction whereby vibration or hammering of the valve is prevented, thus saving considerable wear and tear on the valve and increasing the life thereof.

Manufacturers selling machinery incorporating hydraulic relief valves are beset with a considerable number of complaints arising from break-downs resulting from the purchaser's tampering with the original valve setting to increase the pressure at which the valve will function. In such cases the manufacturer should not be held responsible providing the original valve setting was correct when the machine was shipped. As a safeguard to the manufacturer this invention has for an object to provide novel sealing and locking means for maintaining a predetermined setting of the valve,—which setting cannot be changed without breaking the seal and absolving the manufacturer from responsibility in the case of resultant damage to the machinery.

A further object of the invention resides in the provision of novel means for setting a hydraulic relief valve to release under predetermined pressure, such setting means incorporating means for locking the parts against movement after having been set and which latter means prevents leakage of the fluid,—there being incorporated also sealing means which prevents tampering with the locking means without detection.

A still further object of the invention resides in the provision of a novel hydraulic relief valve or the like, incorporating an adjustable pressure responsive backing for the valve, locking means for said pressure responsive backing, a seal for preventing tampering with the locking means without detection and a casing for the backing means and locking means which is bodily removable for inspection of the valve, the relative construction of said casing and valve backing means being such that the latter cannot be removed from the casing without manipulation of the locking means.

The invention also resides in certain novel features of construction, combination and arrangement of various parts and in certain novel modes of operation,—all of which will be readily understood and appreciated by those skilled in the art upon reference to the accompanying drawing in connection with the following descriptive matter.

While the preferred embodiment of the invention has been depicted herein, yet it will be understood that the same is susceptible of considerable change and modification within the spirit and scope of the invention, as claimed hereinafter.

In the drawing,

Figure 1 is an elevational view of a hydraulic relief valve incorporating my invention;

Figure 2 is an enlarged vertical sectional view taken on the line 2—2 of Figure 1;

Figure 3 is a fragmentary vertical sectional view showing the position of the valve when unseated, it being noted that the same maintains contact with the seat at one point to prevent vibration or hammering, and Figure 4 is a group perspective view illustrating certain of the elements of the device in disassembled relationship.

Referring specifically to the drawing wherein the reference characters have been used to designate the same parts in all views.

Numeral 5 denotes a valve casing which is provided with what might be termed an inlet chamber 6 communicating with a threaded neck 7 which receives the pressure inlet pipe 8.

From the chamber 6 a duct 9,—leading as will be noted at an angle of less than 90° from the vertical,—terminates in the valve seat 10 which is adapted to receive the ball valve 11. The valve seat 10 communicates with the chamber 12 which is of irregular shape, as indicated, and has a side outlet through the tapped boss 13 in which is screwed the outlet or relief pipe 14, as best indicated in Figure 2.

Substantially concentric with the inlet 7 is a tapped hole in the top of the casing 5,— indicated at 15,—and which receives the threaded neck 16ª of a casing 16 whose shoulder 17 is adapted to engage the valve body surrounding the opening 15 to effect the seal at this point. As will be pointed out later on, the casing 16 is capable of being removed to permit inspection of the valve 11 and for purposes of cleaning the seat or chamber 12.

Within the casing 16 is the backing plunger 18, whose cylindrically enlarged head 18ª has a spherical end recess 18ª' adapted to engage the valve 11 to normally hold it on its seat 10. It is to be noted that when the valve 11 is seated the plunger 18 is concentric with the inlet 7, 8, the top end of said backing plunger 18 being guided in its movement by the engagement of its cylindrically enlarged portion 18ᵇ in the somewhat oversized guideway 20ª of the adjusting cup 20, which is threaded in the end of the casing 16. The oversized guideway 20ª and opening through neck 16ª permits the valve engaging end of the plunger to rock slightly transversely of its axis when the valve is unseated. The advantage of this will be explained later.

The coil spring 19 which surrounds the backing plunger 18 has one end bearing against the circumferential flange 18' of the cylindrical portion 18ª. It is to be noted that this flange is of greater diameter than the neck opening through which 18ª projects. Thus, when 16 is unscrewed from the threaded portion 15 of casing 5 the plunger 18 will not be permitted to drop out of the casing 16. The opposite end of the spring 19 bears against the end wall of the adjusting cup 20, as clearly indicated in Figure 2.

It is believed to be manifest from the foregoing description that the adjusting cup 20 can be screwed in the direction of the valve 11 in order to increase the resistance of the valve to unseating pressure. By the same token, screwing of the adjusting cup 20 away from the valve 11 permits the valve to be unseated by lower pressures.

In order to prevent tampering with the adjusting cup 20, I provide the locking cap 21, which as shown in Figure 2, is adapted to be threaded upon the adjusting cup 20 to engage the upper end of the casing 16. Manifestly, when the cap 20 is screwed down tightly against the end of casing 16 the adjusting cup 20 will be locked against movement. While the cap 21 has the very important function just stated,—yet it has the further very important attribute in that it prevents leakage of the fluid beyond the confines of the assembly described. Of course, it will be obvious that some fluid would escape past the cylindrical guide portion 18ᵇ. In order to prevent,—without detection,—removal of the cap 21 and tampering with the adjusting cup 20, I provide the cap 21 with a plurality of circumferentially spaced ears 22.

The casing 16 is provided with one or if desired more than one, ear 23. The ears 22, 23, are apertured to receive the wires forming a part of the seal 24.

It is believed to be readily apparent that the adjustment of cup 20 can only be effected by removal of the cap 21. Furthermore, it is impossible to tamper with the backing plunger 18, since it can only be removed by removal of the cap 21 and adjusting cup 20. This point was mentioned before. Flange 18' prevents removal of the backing plunger 18 through the neck 16ª of the casing 16. When it is desired to inspect the valve 11 the casing 16 can be removed very readily and put back into place without any difficulty at all, since the plunger 18 and spring 19 are maintained in assembly within the casing 16.

The operation of the ball valve 11 is very important. When an unseating pressure exists in duct 9, the valve 11 at first moves slightly in a path concentric with (or substantially concentric with) the axis of duct 9,—maintaining however,—contact with the valve seat 10 at a point 10ª, opposite outlet 14, as shown in Figure 3, due to the spring pressure of plunger 18. The ultimate result is that the ball valve 11 is rocked transversely in contact with one side of its seat.

Considering the spherical valve 11 and its conforming seat 10, as shown, the axis of the seat 10 may be said to be on an angle or bias to the axis of duct 9, as mentioned in certain of the subjoined claims.

When the pressure beneath the valve seat lowers to a predetermined point the plunger 18 forces the valve back on its seat, but without, however, permitting any vibration or hammering due to the fact that the valve 11 always maintains contact with its seat at one point.

Having thus described my invention, what I claim as new and desire to secure by Letters Patent is:

1. A valve structure comprising a valve casing having an inlet and an outlet, said inlet having a seat, a ball valve adapted to engage said seat, an auxiliary casing communicating with and removably carried by said valve casing, a plunger within said auxiliary casing and movable in a path at an angle to the axis of said valve seat whereby the ball valve will maintain contact with said seat at one point when in fluid releasing position, a coil spring surrounding said plunger, an adjusting cup threaded in the outer end of said auxiliary casing whereby to adjust the tension of said spring, said adjusting cup having a guide hole for the rear end of said plunger, the auxiliary casing having a reduced outlet at the end adjacent the valve casing and through which said plunger extends, an abutment carried by said plunger adjacent the valve casing end of said auxiliary casing, said abutment being dimensioned so that it will not pass through the opening of said casing at the valve casing end thereof, a combined locking and fluid sealing cap threaded upon the exterior portion of said adjusting cup and adapted to sealingly engage the rear end of said auxiliary casing, said cap having side ears, ears formed adjacent the rear end of said auxiliary casing, and the ears of said cap and auxiliary casing being apertured, and a sealing device engaging the apertured ears of said cap and auxiliary casing whereby to prevent removal of said cap without detection.

2. The combination of a valve casing, valve and seat and yielding means normally tending to hold said valve seated, the valve casing having an inlet passage communicating with the seat on a bias to the axis of the seat whereby the fluid pressure will tend to force the valve in a path coincident with the axis of said inlet passage and on a bias to the axis of the seat to initially unseat the valve at one side only, and said yielding means maintaining said valve in contact with said seat at one point when an unseating pressure exists in said passage.

3. The combination of a valve casing, a normally seated valve and its seat, the valve casing having an inlet passage communicating with the seat on a bias to the axis of the seat whereby the fluid pressure will tend to force the valve in a path coincident with the axis of said inlet passage and on a bias to the axis of the seat to initially unseat the valve at one side only and means for limiting movement of said valve in the path of the axis of said passage and to maintain the same in contact with the seat at one point.

4. The combination of a valve casing, a normally seated valve and its seat, an inlet passage communicating with said seat, and yielding means acting on said valve to normally hold it seated, said yielding means acting in a path disposed at an angle to the axis of said inlet passage whereby to maintain the valve in rocking contact with its seat at one point in partially unseated position.

5. The combination of a valve casing, a normally seated valve and its seat, an inlet passage communicating with said seat on a bias to the axis thereof, and means including a yielding element acting on said valve for maintaining the valve in contact with a portion of its seat when unseated by fluid pressure in said duct.

6. In a valve structure, a free valve and seat therefor of substantially uniform width at all points, and inlet means through which passage of fluid effects lateral movement of the valve and laterally movable valve seating means maintaining rocking contact of a portion of the valve with its seat when unseated.

7. In a valve structure, a ball valve and seat therefor, and means including an inlet biased to the seat axis through which passage of fluid effects lateral movement of the valve and a universally movable seating member maintaining contact of a portion of the valve with its seat when unseated.

8. In a valve casing having a seat, conduit means for directing fluid through said seat and having its axis arranged on a bias to the axis of said seat, a substantially free valve adapted to engage said seat and to move laterally when unseating under the action of said fluid, seating means adapted to engage said valve and normally acting perpendicular to the seat, and mounting means for said seating means permitting limited lateral movement thereof whereby to hold said valve seated at one point while unseated at another point.

9. The combination of a valve casing, ball valve and seat and conduit means communicating with said seat and mainly at one side of the axis thereof through which the passage of fluid will unseat the valve laterally, a spring plunger engaging the ball valve and movable in a path at an angle to the axis of said valve seat whereby a portion of the ball valve will remain in contact with the seat when the valve is unseated.

10. In a valve casing, a seat of substantially uniform width at all points, a valve movable outwardly away from and laterally of said seat, a casing carried seating member for said valve mounted for movement toward and from said seat in a path substantially perpendicular to said seat, means associated with said seating member and valve casing for mounting the seating member for limited lateral rocking movement with respect to the seat when the valve is unseated, said seating member being adapted to hold said valve in the unseated position against one side of said seat whereby to leave a space at the other side of said seat for the passage of fluid.

11. In a valve casing, a seat, a substantially free valve adapted to engage said seat and adapted for movement laterally of the seat when unseated, a plunger opposed to said valve seat and having an end recess receiving said valve, and said casing having an oversized bearing through which said plunger slidably extends for limited rocking movement transversely of said seat whereby to maintain the valve seated at one point and unseated at another point.

In testimony whereof I affix my signature.

THADDEUS S. GRIMES.